Nov. 1, 1966  M. SELTZER  3,281,967
MEASUREMENT TOOL
Filed March 30, 1964
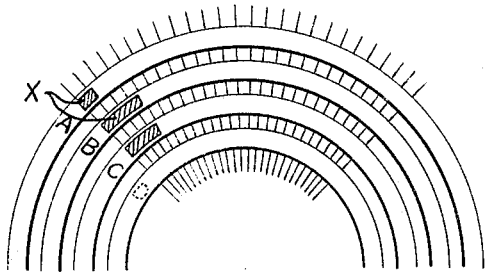
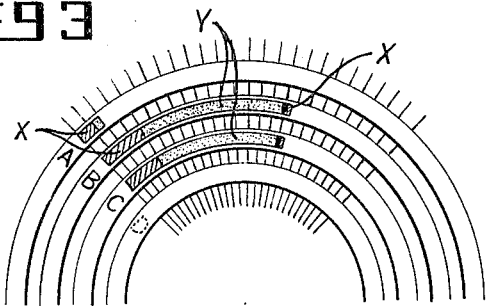
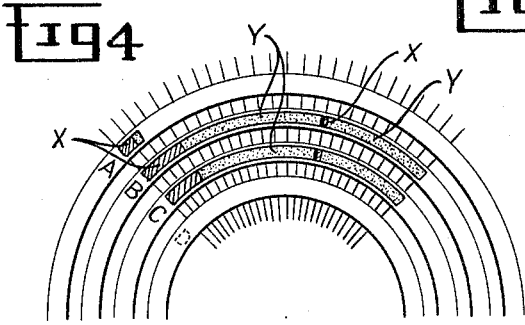
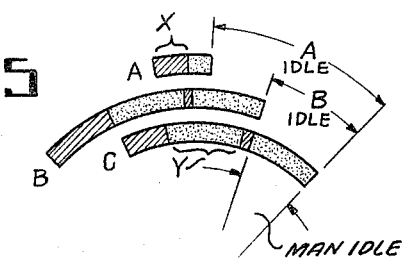
INVENTOR.
MORRIS SELTZER
BY
Harry C. Burgess
ATTORNEY

United States Patent Office 3,281,967
Patented Nov. 1, 1966

3,281,967
MEASUREMENT TOOL
Morris Seltzer, Cincinnati, Ohio, assignor to General Electric Company, a corporation of New York
Filed Mar. 30, 1964, Ser. No. 356,693
2 Claims. (Cl. 35—24)

This invention relates generally to a means for measurement of direct manufacturing effort by man and machine and, more specifically, to an improved tool for establishing more effective time standards on manufacturing stations where one machine operator or worker is employed to operate more than one machine in the course of one or more manufactures.

In a continuing struggle to reduce costs in manufactured goods great strides have been made in improving administration, organization and in methods and means to improve the effectiveness of personnel and utilization of plant machines and equipment. In particular, to reduce operating costs while continuing to improve the value of the product, one area that has come under scrutiny is that time spent directly by the worker in processing (e.g., machining or fabricating) the part or manufacture. Thus, it is important to understand how to accurately measure individual work effort and the effectiveness of man and machine in this area of direct contribution to the manufacturing process. Usually, in the case of a one man-one machine station, the conventional "Time-and-Motion" study methods using a stop-watch, or the like are sufficient. Despite the progress that has been made in improved methods and tools, however, the most universally understood and widely applied system where *more than* one machine is involved is that which is commonly referred to as "man and machine charting." For an explanation of such systems see: Time-and-Motion Study, Lowry, Maynard and Stegemerten, McGraw-Hill Book Company, N.Y. and London (1940), pp. 40–42; Production Handbook, Alford and Bangs, Ed., Ronald Press Co., N.Y. (1949), pp. 529–535. While this system is still used where there is one man and more than one machine, it is rather costly and time-consuming particularly as the job becomes more complex. Further, if the job is too complex to make "man and machine charting" feasible, resort must be had to machines such as computers, random simulators, or other electro-mechanical simulation aids. These have their limitations too, of course, an obvious one being the high cost of the computer-type machines and the limited utility of the manual calculation type for highly complex multiple man, multiple machine operations. Thus, for the typical "job shop" or large production one-man station where there are two or more machines, a more economical method and tool with reasonable accuracy is needed. Further, this should be a tool which is inexpensive to make, requires no special training on the part of the user, has universal application, is fast, accurate and handy to use. One specific use of such tool would be to increase the effectiveness of the man and the machines, particularly in the direct labor (high cost) area, in a multiple machine, one-man manufacturing station operation.

Accordingly, a general object of the invention is to provide an improved tool for the measurement of effective utilization of man and machine in the area of direct contribution to the manufacturing process.

A more specific object of the invention is an improved tool for use in analysis of a manufacturing station where one worker or one machine operator operates more than one manufacturing machine to provide an accurate and visual simulation of the time consumed by the machine operator and the machining operations in performing a preselected manufacture or series of maunfactures.

Still another object of the present invention is to provide a tool for man and machine measurement capable of accurate and visual simulation of the total "idle" time of the man or machine operator and the machines in performing a manufacture or series of manufacturing operations in a one man, mutilple machine manufacturing station.

A still further object is to provide an improved measurement tool for superior utilization of a multiplicty of machines in a direct manufacturing operation to enable accurate production forecasting from one or more manufacturing stations employing a multiplicity of machines operated by one machine operator.

A further object of the invention is to provide an improved means for the avoidance of undesirable combinations of particular machining operations in multiple cycle manufacturing station so as to lower operating costs, improve machine utilization, and to establish a more accurate prediction of job priorities and worker time allowances for a particular manufacture or series of manufactures.

Briefly stated, in a preferred form of the invention, I provide a manually-operated simulator tool for use in the analysis of multiple machine operation cycles performed with a single machine operator, the tool comprising a base member having a plurality of retaining means, the upper surface of the base member being calibrated in graduations having a linear time relationship, and a plurality of machining cycle indicators representing both the machine operator and the machine functions for one of the cycles, the indicators being maintained in overlying relatively movable relationship by respect to the base member by the retaining means. A scale member movable relative to the base member and the cycle indicators may also be provided, the scale being calibrated in graduations having the same linear time relationship as the base member graduations. In accordance with one of the features of the invention, there is provided a plurality of visually differentiable elapsed time elements adapted for affixation to each of the cycle indicators, one of the elements representing elapsed operator time and another representing elapsed machine time for each function for a given cycle performed by the machine operator and the machine, respectively, so as to enable accurate simulation of total operator and total machine effective time and total operator and total machine "idle" time for one or more in a series of manufactures performed at a manufacturing station.

Similarly, for use in a multiple cycle (manufacture by machine) manufacturing station having one machine operator, a preselected order of priority of cycles, and a preselected order of priority of machine operator and machine functions, respectively, within each cycle, there is provided a method, the steps of which comprise: providing a single visually differentiable indication of the elapsed operator time and elapsed machine time, respectively, for each of the multiple cycles or manufactures; simultaneously plotting each of the cycles for each manufacture on a linear time scale by relating the single elapsed time indication for each cycle to the scale; using the plotted single visually differentiable indication for each of the cycles of the station, simulate the station manufacture (or manufactures) while recording the "idle" periods for the machine operator and the machines, respectively, for the manufacture (or manufactures); selecting a controlling interference factor (allowance) cycle for the station; and computing the chargeable station time per manufacture by adding to the controlling interference cycle allowance a "standard" machine operator allowance (both calculated in linear time of the scale) to determine the total station allowance and then finding the ratio $$\frac{\text{Actual time per manufacture for controlling cycle} \times \text{total allowance}}{\text{Number of controlling cycle machines}}$$

It is believed that other objects and many of the attendant advantages presented by the means of the invention will become more apparent and better understood when the following detailed description is read in conjunction with the claims appended hereto, the description including the following drawings, in which:

FIG. 1 is an illustration in plan view of one embodiment of my improved, manually-operated measurement tool;

FIGS. 2–4 illustrate a typical plot for each of the cycles (manufactures) of a manufacturing station on the linear time scale of the tool of FIG. 1; and FIG. 5 is a partial graphic illustration of the simulation of the manufacture or manufactures for a typical multi-cycle manufacturing station, indicating machine operator (e.g., man) and machine elapsed effective, as well as "idle" time.

While a preferred embodiment of the tool is disclosed in FIG. 1, it will be understood that other configurations and modifications of the tool are possible within the scope of the invention. In any case, however, the tool is preferably a desk type model, of reasonable size, which can be manually operated and held in the hand by a non-technical employee or "Time-and-Motion" analyst to perform the steps of my invention. Thus, the tool may comprise a base member, indicated generally at 10, in the form of a generally rectangular flat object having a smooth upper surface, indicated generally at 12. The tool also includes a plurality of machines or machining cycle indicators, the exact number of which will be determined by the typical job to which the tool is applied. In other words, the number of machines utilized or planned to be utilized in performing one or more manufactures (i.e., the product of a process) at any particular manufacturing station will determine the exact number of indicator means since there will be one indicator means for each machine. In the embodiment disclosed in FIG. 1, therefore, a plurality of circular members or rings 14 are provided representing each of the machines in the manufacturing station, in this instance, four in number. The indicator means or rings 14 are maintained in an overlying relatively movable relationship with respect to each other and the base member or board 10 by a suitable retaining arrangement. In the embodiment of FIG. 1, the latter comprises a series of concentric grooves 16 machined or cut into the upper surface 12 of the board about a center point 18. The grooves are of sufficient width and depth to receive each of the ring members labeled, in the example, ring (machine) A, B, C, and D, respectively, in decreasing diameter towards the center point 18. Thus, the machining cycle indicators or ring members 14 are, in this case, embedded in the base member or board 10. The rings are, of course, free to move, i.e., rotate about center point 18 within the grooves and suitable handle means 19 are attached to the rings to enable the operator to rotate them relative to each other and to the board 10. The tool may also include a scale member, indicated generally at 20, which may comprise a transparent or clear plastic piece having a hole through its inner end adapted to be secured by a bolt 22 passing through the center point 18 of the board. The bolt is of the conventional shoulder type to permit relative movement between the scale member 20 and the board and rings. The scale member is used to facilitate accurate recording of "idle" time and is not absolutely essential.

It will be noted from the drawings that the base member includes a plurality of graduations or lines indicated at 24 radiating from center point 18. These lines represent a linear time scale such that each of the lines or units differentiated thereby represent a preselected time in minutes, e.g., 5 minutes per unit. It will be noted that in the embodiment of FIG. 1 since the scale is circular to provide increased flexibility to the tool, that the inner units are foreshortened to enable them to have the same linear time relationship as do the units of the outermost circle. In other words, the units circumscribing the groove 16 in which ring A rotates are farther apart than the units circumscribing the groove in which C rotates. The scale member 20 is also calibrated in a plurality of graduations 26 which have the same linear time relationship as the base member graduations. Thus, the units on the scale member are equal to those superimposed on the base member. For convenience in calculating the "idle" times, as hereinafter described, the scale member units may be sub-divided into half units represented by lines 27. In addition, both the scale member graduations and the base member graduations include a zero reference point, the zero reference point being to the left of the scale on the base 10 and at the right-hand edge of the scale on the scale member 20. It will also be noted that the circle included by the circular indicator means or rings 14 on the base member 10 is only partially graduated, i.e., the "scale" in this case is 90° of the full circle. If, for example, the full circle would include 100 increments or units, then each of the graduations 24 would encompass 3.6°. Similarly, the scale member has the same linear time relationship and comprises only a partial segment of the full circle. In the disclosed embodiment, it is preferred therefore that all the ring movements on my novel tool, which I have chosen to call an "Interference Manulator," start at the left-hand side and move in a clockwise direction from the base zero line.

Turning now to FIG. 2, I will next describe the "setting up" of a number of jobs for a typical multi-machine manufacturing station having a single machine operator, which could be a man or a machine other than those machines performing the series of acts or processes making up each manufacture. The jobs of each cycle are represented by one of the indicator means or rings A, B or C. In accordance with a feature of my invention, a time value is assigned to the units or increments delineated by the graduations on the base member and a plurality of visually differentiable elapsed time elements are provided for each of the functions of the machine operator (man) and the machine, respectively. These visually differentiable indicator elements may comprise, for purposes of illustration, the cross-hatched and shaded areas X and Y in the drawings. It will be understood that in actual practice, these indicator elements can be strips of tape, which are convenient to use with the tool embodiment disclosed herein and which will be of different colors for visually differentiable representation of both the machine operator and machining operation elapsed time, i.e., the work effort or function performed by the man or machine operator and machines for each of the cycles or jobs performed in the specific manufacture(s) which make up the station job(s). Thus, in the novel arrangement of my invention and contrary to conventional "man-machine charting" only a single indicator element for elapsed time X and for elapsed time Y make up each of the cycles, jobs, or manufactures for the multi-cycle manufacturing station. While three such "single" elements are shown in the illustrative embodiment, obviously any number of machines might be simultated, although there will be but one machine operator or worker for the manufacturing station. Turning more specifically now to FIGS. 2–4, where a sample study for a sample manufacturing station is laid out, it will be seen that there are three machines or cycles involved, namely, those represented by rings A, B, and C. For purposes of illustration, it will be further assumed that the first machine ring (A) will perform a broaching operation and the other two machines (B and C) will each perform a hobbing operation. The pieces to be processed in each "manufacture" will have been run through the machines once to enable the operator to ascertain the "raw" manufacturing time per machine. Using the times thus recorded the single visually differentiable indicator means for each cycle for each machine are prepared. For example, if the broaching function takes, let us say 20 minutes, then a period of time having been assigned to each of the graduated units (e.g., 5 minutes) the indicator elements or tapes are trimmed to the appropriate length and affixed to the proper ring. Similarly, the exact elapsed times for the manual machine loading and unloading function performed by the machine operator or the worker and the time it takes for the hobbing operations to be performed by each of the other machines B and C and any time needed for checking or adjustment of the machines by the operator will also be shown by means of the indicator tapes X and Y. It will be preferable in the case of the tool embodiment disclosed in FIG. 1, i.e., the circular scale, to minimize the physical length of the differentiable indicator elements or tapes by putting the shortest element on the largest ring, and so on, in the direction of the ring of smallest diameter. Turning now to FIG. 2, it will be seen that in the case of the broaching operation (cycle) or job the manual function of *loading* will comprise a little less than 1 unit and that *unloading* which takes roughly 2.28 minutes in the ring will comprise .456 units. The total therefore for the "unload-load" manual function operation for the cycle of machine A is approximately 1.256 units (6.28 minutes) as indicated by the shaded section X on the ring, which represents the colored tapes for the machine operator. Again, using the illustrative rings or cycles B and C, the base run there indicated that the unloading operation took 7.5 minutes and the loading 13.7 minutes. Using the same linear time relationship, this works out to 1.5 units for unloading and 2.74 units for loading for a total of 4.24 units each of manual time per hobbing machines B and C. Turning now to FIG. 3, indicated therein are the machining operation functions plotted using the visually differentiable (colored) indicator means Y. It is seen, in this instance, that the elapsed time was a first period of 60 minutes per each machine (12 units on the scale) followed by a second like period since it is necessary to stop the machines and check and adjust the set-up (if required) sometime about the middle of the machining operation, with respect to the hobbers. Thus, an additional allowance of 2.6 minutes or .52 units is allowed for this manual operation, in addition to the 120 minutes for the total machining, and such is indicated by the visually differentiable indicator tape X illustrated at the right-hand portion of FIG. 3. The final plotting or depiction of the manufactures for this multiple station operation is indicated in FIG. 4 wherein the hobbing machines are again turned on and perform the final 60-minute hobbing operation (12 units) indicated on rings B and C.

Use of these unique single visually differentiable indicator means (pairs of colored elements X and Y, in this instance) for each of the cycles of the manufacturing station will permit, according to a feature of my invention, an accurate simulation of the manufacture(s) for the station and an accurate recording of the "idle" periods in the units of the scale of the tool for both the machine operator (man) and the machines for each of the cycles, jobs, or as I have chosen to call them, manufactures for the station. To explain further, it will have been necessary to make certain assumptions before performing the "Interference Manulator" study for the sample station being discussed herein, that is, a station having the one machine operator and one broach and two hobbing machines. These assumptions, as determined, are actually priorities and limitations which will be decided upon by the supervisory personnel or managerial personnel for the station depending on the differing elapsed "raw" times for machines and the fact that certain machines should be kept running in preference to others. In other words, machines which are more expensive to have in a state of idleness most probably will have priority over those which it is relatively inexpensive to let remain in a non-operating state while awaiting parts. Furthermore, it may be required that for certain manual functions, the machine operator should not be interrupted. Thus, in most cases, it will be preferable to arrange that the loading and unloading of the parts being processed by the machines continue until these manual functions are finished without interruption. Normally, inspection of parts should not be interrupted either since it may well be desirable that a running check be kept of parts and to immediately halt the operation if through some malfunction of machine the parts do not meet the job specifications after checking. Other limitations may arise because of physical, i.e., storage problems. Thus, if a man must leave the station to obtain new parts for further processing, or to stack completed parts (manufactures), it will be obvious that he may not be interrupted in this function without a good deal of wasted time. On the other hand, it may not be undesirable to permit interruption of a long and complex setting up operation, assuming that definite steps comprise the set-up which can be interrupted without disturbing the adjustment of the workpiece.

Let it be assumed then, for purposes of the following illustration, that a preselected order of priority of cycles and a preselected order of priority of operator (manual) and machining operation functions within each cycle has been assigned, to wit: (a) keep the longer cycle or hobbing machines B and C producing at all times; (b) only enough parts to be made on the broach to keep one part ready for hobbing (both hobbers) at all times. Thus, the bare times for each of the operations will be charted and the manufacture(s) for this station simulated in the following manner. Using the base member 10 and ring A and having determined that the broaching operation should commence the station manufacture, the left-hand end of the element X on ring A is set at the zero or reference point on the base member scale. Then the zero reference point on the scale member 20 is moved to coincide with the right-hand boundary of the manual time indicator or element X in the ring A. Next, the left-hand side of the tape or indicator element representing the manual or load time on ring B is moved to coincide with the zero reference point on the scale member. The scale member is then moved to again coincide with the right-hand side of element X on ring B at which time the man or machine operator function has ceased. At this time it will be apparent that machine A will have completed its operation and thus the man could turn to this machine, unload it and prepare it to cycle again by loading a new piece. Assuming at the start of the manufacturing operation that a broaching had been performed on two parts so that each hobber could be started, it will be apparent that after a loading operation has been performed on machines A, B and C that the operator will be idle, as will machine A since the machine cycle for the latter is considerably shorter than that for either of the other two machines. As shown in FIG. 4, machine A, machine B, machine C and the man (operator) "idle" times can be measured in terms of units. These units are conveniently recorded on an "Interference Manulator" worksheet such as indicated below.

MACHINE TYPE—PART NO.—OPERATION NO.

A—Broach      Turbine Shaft
B—Hobber         "      "
C—Hobber         "      "
D—

"INTERFERENCE MANULATOR"
WORK SHEET © G.E. Co.

ANALYST_____
AREA_____
DATE_____

| MACH. | LOAD-UNL. | MARK | USE | TOOL CHG. | MISC. |
|---|---|---|---|---|---|
| A | 4.0/2.28 | — | 1.74 | — | — |
| B | 13.7/7.5 | — | 60+60 | — | 2.6 check |
| C | 13.7/7.5 | — | 60+60 | — | 2.6 " |
| D | Above=Min. per occur. | | | | |

| TOTAL STUDY UNITS | 100 | 200 | 300 | 400 | 500 | PLUS |
|---|---|---|---|---|---|---|
| | √ | √ | √ | √ | | 97.5 |

% Interference Per Machine
or
% Man Idle $= \dfrac{\text{Tot. Idle Units}}{\text{Tot. Study Units}}$

| PCS | A | PCS | B | PCS | C | PCS | D | MAN |
|---|---|---|---|---|---|---|---|---|
| | | 1 | 0 | | | | | |
| | | | | 1 | 2.7 | | | |
| 1 | 5.3 | | | | | | | .35 |
| 2 | 0 | | | | | | | 6.0 |
| | | 1 | .5 | | | | | 2.1 |
| | | | | 1 | .5 | | | 8.6 |
| | | 2 | 0 | | | | | |
| | | | | 2 | 1.5 | | | |
| 3 | 26.9 | | | | | | | .35 |
| 4 | 0 | | | | | | | 5.0 |
| | | 2 | .5 | | | | | 3.5 |
| | | | | 2 | .5 | | | 8.0 |
| | | 3 | 0 | | | | | .2 |
| | | | | 3 | 0 | | | |
| 5 | 25.8 | | | | | | | .35 |
| 6 | 0 | | | | | | | 4.6 |
| | | 3 | .5 | | | | | |
| | | | | 3 | .5 | | | 3.5 |
| | | 4 | 0 | | | | | 7.8 |
| | | | | 4 | 0 | | | .2 |
| 7 | 25.2 | | | | | | | .35 |
| 8 | 0 | | | | | | | 4.5 |
| | | 4 | .5 | | | | | 3.5 |
| | | | | 4 | .5 | | | 8.2 |
| | | 5 | 0 | | | | | |
| | | | | 5 | 0 | | | |
| 9 | 25.6 | | | | | | | .35 |
| 10 | 0 | | | | | | | 4.5 |
| | | 5 | .5 | | | | | 3.6 |
| | | | | 5 | .5 | | | .80 |
| | | 6 | 0 | | | | | .2 |
| | | | | 6 | 0 | | | |
| 11 | 25.7 | | | | | | | .35 |
| 12 | 0 | | | | | | | 4.3 |
| | | 6 | .5 | | | | | 3.8 |
| | | | | 6 | .5 | | | 7.8 |

A = ____ %

B = ____ %

C = ____ %

D = ____ %

OPERATOR
____ %

THE VALUE OF ONE UNIT IN THIS STUDY IS
    5.0 MIN.

See footnote at end of table.

| PCS | A | PCS | B | PCS | C | PCS | D | MAN |
|---|---|---|---|---|---|---|---|---|
|  |  | 7 | 0 |  |  |  |  | .3 |
|  |  |  |  | 7 | 0 |  |  |  |
| 13 | 25.7 |  |  |  |  |  |  | .35 |
| 14 | 0 |  |  |  |  |  |  | 4.9 |
|  |  | 7 | .5 |  |  |  |  | 3.8 |
|  |  |  |  | 7 | .5 |  |  | 7.6 |
|  |  | 8 | 0 |  |  |  |  | .5 |
|  |  |  |  | 8 | 0 |  |  |  |
| 15 | 25.7 |  |  |  |  |  |  | .35 |
| 16 | 0 |  |  |  |  |  |  | 3.4 |
|  |  | 8 | .5 |  |  |  |  | 4.2 |
|  |  |  |  | 8 | .5 |  |  | 7.5 |
|  |  | 9 | 0 |  |  |  |  | .7 |
|  |  |  |  | 9 | 0 |  |  |  |
| 17 | 25.8 |  |  |  |  |  |  | .35 |
| 18 | 0 |  |  |  |  |  |  | 4.1 |
|  |  | 9 | .5 |  |  |  |  | 4.3 |
|  |  |  |  | 9 | .5 |  |  | 7.3 |
|  |  | 10 | 0 |  |  |  |  | .8 |
|  |  |  |  | 10 | 0 |  |  |  |
| 19 | 25.8 |  |  |  |  |  |  | .35 |
| 20 | 0 |  |  |  |  |  |  | 3.5 |
|  |  | 10 | .5 |  |  |  |  | 4.4 |
|  |  |  |  | 10 | .5 |  |  | 7.2 |
|  |  | 11 | 0 |  |  |  |  | .9 |
|  |  |  |  | 11 | 0 |  |  |  |
| 21 | 25.5 |  |  |  |  |  |  | .35 |
| 22 | 0 |  |  |  |  |  |  | 3.5 |
|  |  | 11 | .5 |  |  |  |  | 4.5 |
|  |  |  |  | 11 | .5 |  |  | 7.2 |
|  |  | 12 | 0 |  |  |  |  | 1.0 |
|  |  |  |  | 12 | 0 |  |  |  |
| 23 | 25.7 |  |  |  |  |  |  | .35 |
| 24 | 0 |  |  |  |  |  |  | 3.3 |
|  |  | 12 | .5 |  |  |  |  | 4.7 |
|  |  |  |  | 12 | .5 |  |  | 6.9 |
|  |  | 13 | 0 |  |  |  |  | 1.2 |
|  |  |  |  | 13 | 0 |  |  |  |
| 25 | 25.7 |  |  |  |  |  |  | .35 |
| 26 | 0 |  |  |  |  |  |  | 3.2 |
|  |  | 13 | .5 |  |  |  |  | 4.8 |
|  |  |  |  | 13 | .5 |  |  | 6.8 |
|  |  | 14 | 0 |  |  |  |  | 1.4 |
|  |  |  |  | 14 | 0 |  |  |  |
| 27 | 25.7 |  |  |  |  |  |  | .35 |
| 28 | 0 |  |  |  |  |  |  | 3.2 |
|  |  | 14 | .5 |  |  |  |  | 5.0 |
|  |  |  |  | 14 | .5 |  |  |  |
|  |  | 15 | 0 |  |  |  |  | 1.1 |
|  |  |  |  | 15 | 0 |  |  |  |
| 29 | 25 |  |  |  |  |  |  | .35 |
| 30 | 0 |  |  |  |  |  |  | 3.7 |
|  |  | 15 | .5 |  |  |  |  | 4.7 |

$A = \underline{\phantom{xxx}} \%$ $A = \dfrac{440}{497.5} 88.4\%$ $B = \dfrac{14.2}{497.5} 2.8\%$ $C = \dfrac{12.7}{497.5} 2.6\%$ $D = \underline{\phantom{xxx}} \%$

OPERATOR $\dfrac{288.65}{497.5} = 58\%$

THE VALUE OF ONE UNIT IN THIS STUDY IS 5.0 MIN.

See footnote at end of table.

| PCS | A | PCS | B | PCS | C | PCS | D | MAN |
|---|---|---|---|---|---|---|---|---|
| | | | | 15 | .5 | | | 7.0 |
| | | 16 | 0 | | | | | 1.2 |
| | | | | 16 | 0 | | | |
| 31 | 25.9 | | | | | | | .35 |
| 32 | 0 | | | | | | | 5.5 |
| | | 16 | .5 | | | | | 4.7 |
| | | | | 16 | .5 | | | 6.8 |
| | | 17 | 0 | | | | | 1.8 |
| | | | | 17 | 0 | | | |
| 33 | 27.3 | | | | | | | .35 |
| 34 | 0 | | | | | | | 3.5 |
| | | 17 | .5 | | | | | 5.0 |
| | | | | 17 | .5 | | | 6.7 |
| | 21.7 | | 5.7 | | 0 | | | 12.3 |
| | 440.0 | | 14.2 | | 12.7 | | | 288.65 |

NOTE: Put Shortest Job on Machine "A".

The preferred worksheet shown hereinabove includes space for indicating the machine type, recording of the initial "raw" machining times for each of the machining operations, and the number of total units in the study. Under the columns on the chart there will be recorded the number of pieces in the study and the "idle" times per piece for the machines and the man. The value of the units in the study is also recorded in minutes. At the end of the study, a value (percent of total time) that the man and each machine is inoperative or "idle" is indicated in the column to the right. In the example shown it will be seen that if one of the machines in the study is idle due to the operator being unavailable as the machining function ends, the unit of "idle" time for the machine, i.e., the "interference factor" is recorded. Note that every time the part being worked on passes the zero reference point on the board 10, which, in this case, comprises a total of 100 units in the scale, this fact is recorded in the box entitled "Total Study Units." When the study is completed, the worksheets reveal the total units of "interference" on each of the machines and the total units the operator is "idle." Converting from units back to minutes reveals the "interference factor" as a percent $$\frac{\text{Total units idle time}}{\text{Total study units}} = X\%$$

In the example shown, it will be seen that the idle time for machine A is 88.4%, for machine B 2.8%, for machine C 2.6% and for the operator 58%. Keeping in mind, therefore, the preselected priorities assigned to this station, i.e., that the hobbing machines keep producing and that only enough parts be made on the broaching machine to keep one part ready for hobbing on each hobber at all times, it will be seen that production on the station is controlled by that machine (hobber) which has the greatest interference or units of "idle" time. In the example it is machine B, having an "interference factor" of 2.8%, which would therefore be selected as the controlling cycle or "interference factor" on the station. This would be true since the hobbing cycle is considerably longer than the broaching cycle. Thus, the "interference factor" of 2.8 is used to compute the chargeable operator station time for the operator per manufacture. In addition, the percentage of time the operator is "idle," (i.e., man utilization), whether the operator has enough "idle" time to allow him to perform other tasks, how much production can be expected from the machines, certain types of job combinations to be avoided, machine utilization, and priorities on the operator's activities may be determined, to name only some of the interpretations possible with my improved measurement method and tool.

Normally, it will be required that an industry figure representing a "standard allowance per station" be also figured into the calculation. For example, it is common to allow an operator a 5% factor as a "personal time" allowance. Further, time is usually allowed for additional clean-up and unavoidable delays such as chip removal and the like. This study would indicate that since the operator has only utilized 42% of the time $$(100\% - 58\% = 42\%)$$

that perhaps the standard allowance should not exceed a certain value. Therefore, by taking the "raw" or basic time to produce each piece (which in this case amounted to 143.8 minutes per piece) adding the normal station allowance (in the case above given as 11.5%) to the interference factor allowance of 2.8% simulated by use of the "Interference Manulator"—giving a total of 14.3% as the total allowance"—the ratio $$\frac{\text{Actual time per manufacture per piece) (143.8) times the total allowance (1.143)}}{\text{Number (2) of the controlling cycle machines (hobbers)}} = 82.18$$

gives us 82.18 minutes per piece. This may be converted to hours per 100 pieces or any other form which may be desirable. From this figure, a time standard for reasonably effective use of the man and machines may be set for the particular job. The chargeable time per piece for the multi-cycle manufacturing station may be used to set job rates, for example, since it enables a complete and thorough analysis of what is taking place. The "Interference Manulator" of my invention is thus an improvement over the conventional "man-machine" charting.

While I have described what is presently considered the preferred embodiments of this invention, it will be obvious to those skilled in the art that many changes and modifications may be made therein without departing from the invention, and it is therefore intended to cover in the appended claims all such changes and modifications as fall within the true spirit and scope of the invention.

I claim:
1. In a manually-operated tool for use in analysis of multiple machining operation cycles performed with a single machine operator:
- a base member, said base member including a plurality of retaining means comprising a series of spaced concentric grooves in said base member surface, the upper surface area of said base member being at least partially calibrated in graduations having a specified linear time relationship;
- a plurality of machining cycle indicators, there being one indicator for each of said cycles, said indicators being maintained in an overlying relatively movable relationship with respect to said base member by said retaining means and comprising ring members completely disposed in respective ones of said grooves for rotation about a center point;
- a scale member movable relative to said base member and said indicators, said scale member being calibrated in a plurality of graduations having the same linear time relationship as said base member graduations;
- and a plurality of visually differentiable elapsed time elements adapted for affixation to each of said indicators, one visually differentiable element representing elapsed machine operator time and another representing elapsed machining operation time for the functions for a given cycle performed by the machine operator and the machine, respectively, said indicators and said scale member being moved cooperatively with respect to each other and said base member for accurate simulation of total machine operator and total machine effective time and total machine operator and total machine idle time for one or more in a series of manufactures.

2. A manually-operated tool according to claim 1 wherein said base member graduations comprise at least a 90° arc encompassing said circular grooves and said scale member comprises a transparent wedge-shaped piece of substantially less arc than said base member graduations, said scale member being pivotally affixed to said base member at said center point for movement thereabout.

References Cited by the Examiner

UNITED STATES PATENTS

| 1,703,206 | 2/1929 | Peters | 116—133 |
| 2,188,480 | 1/1940 | Murray | 35—31.4 X |
| 3,912,776 | 11/1959 | Koerber | 116—133 |

FOREIGN PATENTS

| 449,015 | 6/1936 | Great Britain. |

EUGENE R. CAPOZIO, *Primary Examiner.*

W. GRIEB, *Assistant Examiner.*